MAGNETIC CORE ADDING DEVICE

Original Filed Aug. 19, 1957 2 Sheets-Sheet 1

INVENTORS
THEODOR EINSELE
KARL GANZHORN

BY Roger S. Smith

ATTORNEY

United States Patent Office

Re. 25,518
Reissued Feb. 4, 1964

25,518

MAGNETIC CORE ADDING DEVICE

Theodor Einsele and Karl Ganzhorn, both of Sindelfingen, Wurttemberg, Germany, assignors to International Business Machines Corporation, New York, N.Y., a corporation of New York Original No. 2,967,665, dated Jan. 10, 1961, Ser. No. 678,852, Aug. 19, 1957. Application for reissue July 6, 1962, Ser. No. 208,152
Claims priority, application Germany Aug. 31, 1956
14 Claims. (Cl. 235—168)

Matter enclosed in heavy brackets [ ] appears in the original patent but forms no part of this reissue specification; matter printed in italics indicates the additions made by reissue.

This invention relates to [adding] *computing* devices, and particularly to [an adding] *a computing* device employing bistable magnetic cores.

In electrical computing equipment, numbers may be represented by the presence of a pulse on a selected one of a plurality of digit lines, e.g., in a decimal system, ten digit lines, one such digit line corresponding to each of the different digits, may be employed, with the presence of a pulse on any line corresponding to the digit value assigned to that line.

In such systems, usually designated as parallel systems, [adding] *computing* devices heretofore employed have been characterized by requiring relatively large numbers of components for decimal inputs, such as vacuum tube, semiconductor, or magnetic core logical devices, so that such adding devices are relatively uneconomical, despite their inherent advantage of relatively high speed operation.

This invention provides *in the illustrative embodiment* an arrangement which utilizes a reduced or minimized number of components to provide a parallel adder by employing two matrices of bistable magnetic cores, with the digit lines carrying the addend and augend information inductively coupled to the cores in columnar and row arrangements, so that for any given addend and augend a selected core in one of the two matrices is changed from a first to a second stable state, thereby inducing an output pulse on one or more of a plurality of output lines inductively coupled to the cores of both matrices. The parts are arranged so that in the case where no carry has occurred the output pulse appears on a line corresponding to the sum of the addend and augend, but where a carry has occurred, the output pulse appears on the line or lines corresponding to the sum plus one. Additionally, each addition producing a carry produces a pulse on a carry line which may be employed for control purposes. Selection between the two matrices is accomplished by selective inhibition of all of the cores in one or the other of the two matrices.

Accordingly, an object of the present invention is to provide an improved magnetic core [adding] *computing* device utilizing two selectively controlled core matrices, one of which provides *one function, for example,* a direct sum of the inputs and the other of which provides *another function, for example,* the sum of the inputs plus one, as required by a carry operation.

Another object of the invention is to provide a magnetic core adding device utilizing two coordinate matrices each of which is connected to the addend and augend input lines, and having the matrices selectively inhibited in accordance with carry operations, so that the common output lines provide a signal corresponding to the direct sum or the sum increased by one.

A further object of the invention is to provide an improved magnetic core adding device particularly suited for parallel multiorder operation and utilizing a reduced number of components.

Yet another object of the invention is to provide an improved magnetic core adding device.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference characters refer to similar parts in each of the several views.

Figure 1:
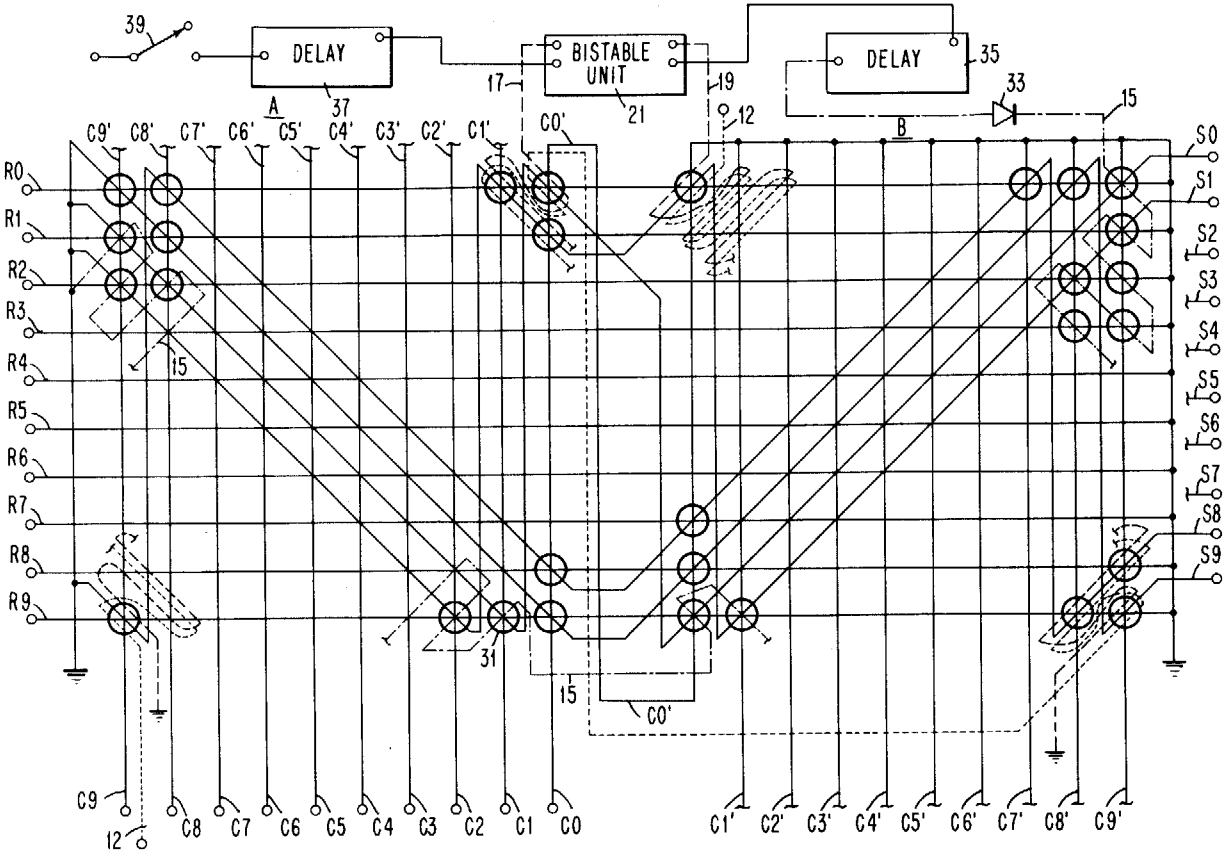
FIG. 1 is a diagrammatic illustration showing, in schematic form, a magnetic core adding device in accordance with a preferred embodiment of the invention.

Referring to FIG. 1 of the drawings, two rectangular matrices, designated as matrix A and matrix B, are provided, each having in the present embodiment ten columns of ten rows each of magnetic cores, so that one hundred cores are provided in each of the matrices. The two inputs, representing the numbers to be added, consist of ten input lines each, the horizontal or row lines being designated by the reference characters R0 through R9, and the vertical or column lines being designated by the reference characters C0 through C9. As can be seen from the drawing, the row lines thread all of the cores in the associated row in series in both matrices, and the column lines thread all of the cores in associated columns of both matrices, as indicated diagrammatically by the circles shown at some of the intersections. To clarify the drawings, the connections of the column lines between the two matrices, other than C0, are not shown, but are indicated by the primed reference characters, e.g., C1′ at the top of matrix A is connected directly to C1′ at the bottom of matrix B. A bias winding 12 indicated by the dotted line in FIG. 1 threads each core in the two matrices to provide a polarizing or biasing magnetomotive force, in a manner and for purposes to be subsequently described. In order to clarify the drawings, certain of the windings are not shown in their entirety. Output signals are provided on one or more output lines, depending on the particular coding chosen for representing the sum of the numbers to be added. In the embodiment shown in FIG. 1, ten lines are provided, and the output appears on one of the lines designated by the reference characters S0 through S9, corresponding to the appropriate decimal digit value. These output lines are threaded through all of those cores in matrix A which represent sums corresponding to the digit value assigned to the output lines, and are also threaded through the cores in matrix B which correspond to the output value plus one. For example, output line S8 is carried through all the cores which may be reversed by input combinations having the sum of 8, such as those found at the intersection of row line R8 and column line C0, R7/C1, R6/C2, R5/C3, R4/C4, R3/C5, R2/C6, R1/C7, and R0/C8. Also, since the sum of 9 plus 9 equals 18, S8 threads the core R9/C9, to provide the low order digit of the sum.

In matrix B, the cores are threaded by the output lines corresponding to the sum of the inputs plus one. Thus S8 threads the cores of matrix B at the intersections C9/R0, C8/R9, C7/R0, C6/R1, C5/R2, C4/R3, C3/R4, C2/R5, C1/R6, and C0/R7. Thus, if the inputs C5/R2 are energized, the selected core provides an output pulse on line S8, which is one greater than the actual sum 7. A carry line 15 is threaded through each of the cores in the two matrices which is involved in an adding operation resulting in a carry, in the particular example, in any instance where the sum of the two inputs exceeds 9, an impulse is induced in the winding 15 which is used for control purposes. Control windings 17 and 19 are additionally provided, associated with matrix A and matrix B respectively, and these windings are energized from the outputs of a bistable unit 21, the details of which are not shown but which may be of any suitable type, such as a well-known flip-flop or electronic trigger circuit. The parts are arranged so that at any given time, either winding 17 or winding 19 is energized to provide an inhibiting action for all of the cores in the associated matrix.

Figure 2:
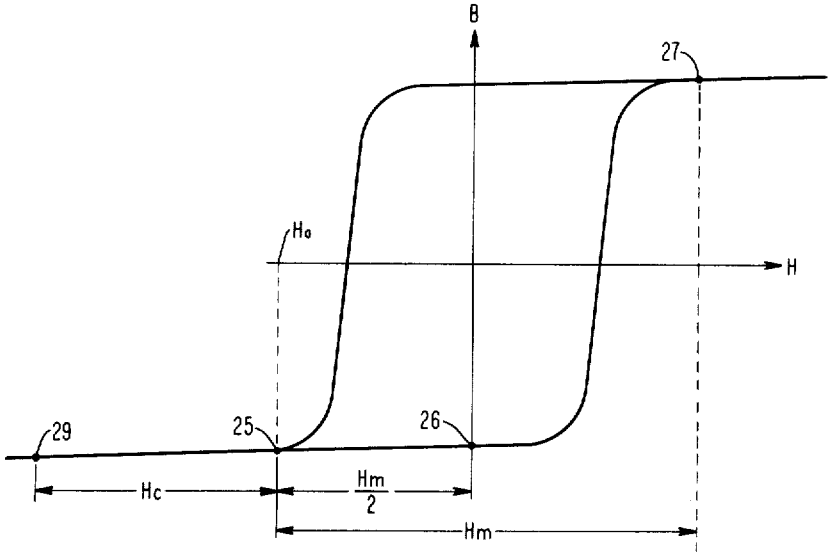
FIG. 2 is an illustration of a typical hysteresis loop of magnetic core material such as may be employed in the cores of the subject invention.

Turning now to FIG. 2 of the drawings, the cores are all provided with a biasing magnetomotive force as a result of a biasing current flowing in the biasing line 12, which threads each of the cores, so that a magnetizing force $H_o$ causes each of the cores to assume an initial or resting position on the hysteresis curve designated by the reference character 25. The impulses supplied to the input lines of the matrices are sufficient to provide a magnetizing force of value $$\frac{H_m}{2}$$

which is applied in a direction opposite to that of the biasing magnetomotive force, so that, with one of the two coordinate input lines threading a core energized by an input pulse, the core shifts its magnetic state to the point represented by reference character 26. Energization of a single input winding threading the core will therefore not cause the core to reverse its magnetization. However, if the two inputs which thread a core are both simultaneously energized, a total magnetizing force of $H_m$ will be applied to the core, thus causing it to reverse its magnetization and shift to the point on the hysteresis curve designated by reference character 27. This large change in magnetization of the core induces impulses in the various output windings threading the selected core, The control windings 17 and 19 supply to the core in the associated matrices current of such value to increase the field intensity by an amount $H_c$ in the direction of the biasing magnetization $H_o$, so that at all times that control energy is supplied through one of windings 17 and 19, the cores in the associated matrix remain at position 29 on the hysteresis curve, and the supply of input pulses to the cores is ineffective to reverse the magnetization of the cores. It can also be seen that any cores which have been selected and are resting at point 27 on the magnetization curve as a result of coincident inputs thereto will be returned to point 29 when energy is supplied to the control windings 17 or 19 associated with the selected core.

Figure 3:
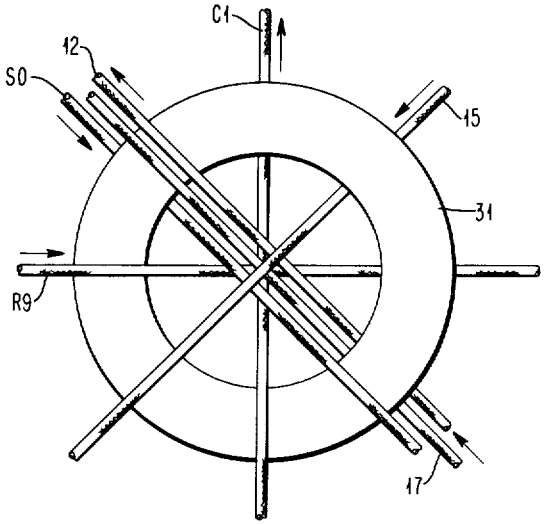
FIG. 3 is an enlarged illustration of the manner in which the various windings illustrated in FIG. 1 are threaded through one of the cores in the matrix.

FIG. 3 of the drawings illustrates in schematic fashion the manner in which the various windings provided in the matrices are threaded through a core to provide the operation described in connection with the hysteresis loop shown in FIG. 2. In the particular example selected for FIG. 3, a core 31 located at the intersection of row line R9 and column line C1 has been selected for illustration, but it will be apparent from this one example how the remaining cores and the matrices are threaded by the different windings. As shown, the column line C1 and the row line R9 intersect the core in such manner that when input impulses are supplied to these windings so that current flows in the directions of the arrows shown in the drawings, a magnetizing force acting in a clockwise direction will be set up in the core. If the inhibiting winding 17 is energized at this time, the current flowing therethrough in the direction of the arrow, in addition to the current flowing in bias winding 12 in the direction shown by the associated arrow, will neutralize the effects of the input currents in the column and row input lines. However, if no current is flowing in the inhibiting winding 17, the values of the current in windings R9 and C1 will be sufficient to overcome the opposing magnetomotive force set up by the current flowing in winding 12. Accordingly, the core 31 will be driven to the point 27 on the hysteresis curve shown in FIG. 2, with the result that voltages are induced in the output winding S0 and in the carry winding 15, the directions of the currents which flow as a result of these impulses being designated by the arrows, in accordance with Lenz's law.

Returning to FIG. 1 of the drawings, the description of the embodiment of the invention illustrated in the drawing will be enhanced by describing the operation of the arrangement under several different conditions.

Assuming that the apparatus is in its normal condition, the bistable unit 21 will be set so that inhibit line 19 is energized and line 17 is de-energized. Under these conditions, matrix A is effective and matrix B is ineffective for the addition of incoming signals. Input pulses applied simultaneously to the row and column input windings will cause the core intersected by the two energized lines to reverse its magnetization thereby inducing a pulse on the output line representative of the sum of the two inputs, since, as previously pointed out, the output lines are threaded through each of the cores which can produce this sum. For example, output line S8 is threaded through the cores in matrix A at the intersections of columns R8/C0, R7/C1, R6/C2, R5/C3, etc., so that in the event that any of these input line combinations are energized, the resulting impulse will appear on the output line S8. The carry winding 15 is threaded through each core in matrix A which represents a sum having a value greater than nine. For example, the carry winding 15 is threaded through the intersections R9/C1, R9/C2, R8/C2, R9/C3, etc., so that an output impulse is induced on carry line 15 in any case where the addition of the two inputs produces a sum greater than nine.

If the combination of input pulses is such that a carry impulse is provided on line 15, this pulse is passed through diode 33 and a suitable delay device 35 to the righthand input terminal of bistable unit 21. Energization of this terminal causes the bistable unit to reverse its state, so that inhibiting wnding 17 becomes energized and winding 19 becomes de-energized. Accordingly, matrix A is inhibited and matrix B is freed to operate. The delay unit 35 may be of any suitable type, such as a mechanical or electrical delay device which interposes a predetermined time interval between the time the pulse supplied over the carry winding 15 is applied thereto and the time that a pulse is delivered from the delay unit 35 to the right-hand input to bistable unit 21. Accordingly, at some predetermined time after the addition of the inputs has taken place, the bistable unit 21 will be switched to switch the matrices from the noncarry to the carry condition. A subsequent input to the column and row lines will then affect the selected core in matrix B rather than the core in matrix A. Since, as previously pointed out, the output lines S0 through S9 are threaded through cores in matrix B which represent the number one greater than the sum of the inputs, it can be seen that the output signals supplied on the lines S0 through S9 will be increased by one to account for the carry operation resulting from the addition of the previous numbers.

Following each addition and before the arrival of the delayed carry impulse to reverse bistable unit 21, if such an impulse is provided, a restoring signal is supplied through a delay 37 by closure of a suitable circuit, here illustrated diagrammatically as including a switch 39, so that when switch 39 is closed momentarily, a delayed impulse will be supplied to bistable unit 21 to revert this unit to its normal condition. Such an impulse would be supplied by closing switch 39 at the same time that the input pulses are supplied to the row and column lines of the adder device.

From the foregoing, it will be apparent that the present invention provides a novel method of adding numbers represented by impulses supplied on one of the plurality of digit representing lines, by the use of two magnetic core matrices, selectively arranged to provide either the true sum, or the sum plus one, of the numbers supplied thereto, in accordance with carry conditions on a single set of output lines. It will be readily apparent to those skilled in the art that the numerical system employed with this device particularly with regard to the output code is not limited to the decimal code as shown, but may include other types of codes where numbers are represented by the presence of pulses on one or more lines simultaneously, such as, for example, a two-out-of-five code pattern, by threading the output windings in various combinations through the cores which are selected by the inputs to represent the sum, with or without a carry.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An adding device for adding numbers represented by the presence of a pulse on one of a plurality of digit lines, comprising in combination, a first and a second matrix of bistable magnetic cores, first and second sets of input digit lines representing the numbers to be added, said first and second sets of input digit lines threading the cores of each of said matrices in corresponding coordinates, so that a predetermined core in each of said matrices is effectively energized for each combination of inputs by coincident energization of the two input digit lines intersecting the core, a plurality of output digit lines, said output digit lines being inductively coupled to the cores in said first matrix, said coupled cores being selected by a combination of input lines wherein the summation of the digit values corresponding to each of said combined input lines is equal to a value corresponding to that indicative of the digit value of the respective output lines inductively coupled to the cores selected, and being inductively coupled to the cores in said second matrix, said coupled cores being selected by a combination of input lines wherein the summation, increased by one, of the digit values corresponding to each of said combined input lines is equal to a value corresponding to that indicative of the digit value of the respective output line inductively coupled to the cores selected, and means for selectively controlling the magnetization of all of the cores in said first or said second matrices.

2. An adding device for adding numbers represented by the presence of a pulse on one of a plurality of digit lines, comprising in combination, a first and a second matrix of bistable magnetic cores, first and second sets of input digit lines representing the numbers to be added, said first and second sets of input digit lines threading the cores of each of said matrices in corresponding coordinates, so that a predetermined core in each of said matrices is effectively energized for each combination of inputs by coincident energization of the two input digit lines intersecting the core, a plurality of output digit lines, said output lines being inductively coupled to the cores in said first matrix, said coupled cores being selected by a combination of input lines wherein the summation of the digit values corresponding to each of said combined input lines is equal to a value corresponding to that indicative of the digit value of the respective output lines inductively coupled to the cores selected, and being inductively coupled to the cores in said second matrix, said coupled cores being selected by a combinaiton of input lines wherein the summation, increased by one, of the digit values corresponding to each of said combined input lines is equal to a value corresponding to that indicative of the digit value of the respective output line inductively coupled to the cores selected, means for selectively controlling the magnetization of all of the cores in said first or said second matrices, and a carry signal line inductively coupled to each core in said matrices which represents a multiorder sum value.

3. An adding device for adding numbers represented by the presence of a pulse on one of a plurality of digit lines, comprising in combination, a first and a second matrix of bistable magnetic cores, first and second sets of input digit lines representing the numbers to be added, said first and second sets of input digit lines threading the cores of each of said matrices in corresponding coordinates, so that a predetermined core in each of said matrices is effectively energized for each combination of inputs by coincident energization of the two input digit lines intersecting the core, a plurality of output digit lines, said output lines being inductively coupled to the cores in said first matrix, said coupled cores being selected by a combination of input lines wherein the summation of the digit values corresponding to each of said combined input lines is equal to a value corresponding to that indicative of the digit value of the respective output lines inductively coupled to the cores selected, and being inductively coupled to the cores in said second matrix, said coupled cores being selected by a combination of input lines wherein the summation, increased by one, of the digit values corresponding to each of said combined input lines is equal to a value corresponding to that indicative of the digit value of the respective output line inductively coupled to the cores selected, a carry signal line inductively coupled to each core in said matrices which represents a multiorder sum value, and control means governed by impulses induced in said carry signal line for selectively disabling said first or said second matrix.

4. An adding device for adding numbers represented by the presence of a pulse on one of a plurality of digit lines, comprising in combination, a first and a second matrix of bistable magnetic cores, first and second sets of input digit lines representing the numbers to be added, said first and second sets of input digit lines threading the cores of each of said matrices in corresponding coordinates, so that a predetermined core in each of said matrices is effectively energized for each combination of inputs by coincident energization of the two input digit lines intersecting the core, a plurality of output digit lines, said output lines being inductively coupled to the cores in said first matrix, said coupled cores being selected by a combination of input lines wherein the summation of the digit values corresponding to each of said combined input lines is equal to a value corresponding to that indicative of the digit value of the respective output lines inductively coupled to the cores selected, and being inductively coupled to the cores in said second matrix, said coupled cores being selected by a combination of input lines wherein the summation, increased by one, of the digit values corresponding to each of said combined input lines is equal to a value corresponding to that indicative of the digit value of the respective output line inductively coupled to the cores selected, a carry signal line inductively coupled to each core in said matrices which represents a multiorder sum value, and control means governed by impulses induced in said carry signal line for selectively disabling said first or said second matrix, said control means including a bistable device effective in a first stable state to disable said second matrix and effective in a second stable state to disable said first matrix, said bistable device being governed by impulses on said carry signal line to operate from its first to its second stable state.

5. An adding device for adding numbers represented by the presence of a pulse on one of a plurality of digit lines, comprising in combination, a first and a second matrix of bistable magnetic cores, first and second sets of input digit lines representing the numbers to be added, said first and second sets of input digit lines threading the cores of each of said matrices in corresponding coordinates, so that a predetermined core in each of said matrices is effectively energized for each combination of inputs by coincident energization of the two input digit lines intersecting the core, a plurality of output digit lines, said output lines being inductively coupled to the cores in said first matrix, said coupled cores being selected by a combination of input lines wherein the summation of the digit values corresponding to each of said combined input lines is equal to a value corresponding to that indicative of the digit value of the respective output lines inductively coupled to the cores selected, and being inductively coupled to the cores in said second matrix, said coupled cores being selected by a combination of input lines wherein the summation, increased by one, of the digit values corresponding to each of said combined input lines is equal to a value corresponding to that indicative of the digit value of the respective output line inductively coupled to the cores selected, a carry signal line inductively coupled to each core in said matrices which represents a multiorder sum value, and control means governed by impulses induced in said carry signal line for selectively disabling said first or said second matrix, said control means including a bistable device effective in a first stable state to disable said second matrix and effective in a second stable state to disable said first matrix, said bistable device governed by impulses on said carry signal line to operate from its first to its second stable state, and restoring means connected to said bistable device for restoring said bistable device from its second to its first state.

6. A magnetic core matrix adding device for adding digits represented by the presence of a pulse on a selected one of a plurality of digit lines comprising, in combination, a first and a second set of input digit lines for supplying pulses representing the addend and augend, a first and a second rectangular matrix of bistable magnetic cores, the cores in each matrix being arranged in columns corresponding to said first set of input digit lines and arranged in rows corresponding to said second set of input lines, said first set of digit input lines being inductively coupled to the cores in the associated columns of each matrix, said second set of digit input lines being inductively coupled to the cores in the associated rows of each matrix, the parts being selected and arranged so that coincident energization of the first and second digit lines intersecting a core in each matrix is required to reverse the core from a first to a second stable state, means for biasing said cores to their first stable state, a plurality of output digit lines, said output digit lines being inductively coupled to the cores in said first matrix representing the equivalent sums of the numbers represented by the input digit lines associated with the cores, and being inductively coupled to the cores in said second matrix representing the equivalent sums, reduced by one, of the numbers represented by the input digit lines, a carry signal line inductively coupled to each of the cores in said matrices selected by input combinations which involve a carry operation, and control means for selectively disabling said first or said second matrix.

7. A magnetic core matrix adding device for adding digits represented by the presence of a pulse on a selected one of a plurality of digit lines comprising, in combination, a first and a second set of input digit lines for supplying pulses representing the addend and augend, a first and a second rectangular matrix of bistable magnetic cores, the cores in each matrix being arranged in columns corresponding to said first set of input digit lines and arranged in rows corresponding to said second set of input lines, said first set of digit input lines being inductively coupled to the cores in the associated columns of each matrix, said second set of digit input lines being inductively coupled to the cores in the associated rows of each matrix, the parts being selected and arranged so that coincident energization of the first and second digit lines intersecting a core in each matrix is required to reverse the core from a first to a second stable state, means for biasing said cores to their first stable state, a plurality of output digit lines, said output digit lines being inductively coupled to the cores in said first matrix representing the equivalent sums of the numbers represented by the input digit lines associated with the cores, and being inductively coupled to the cores in said second matrix representing the equivalent sums, reduced by one, of the numbers represented by the input digit lines, a carry signal line inductively coupled to each of the cores in said matrices selected by input combinations which involve a carrying operation, and control means for selectively disabling said first or said second matrix, said control means being governed by said carry signal line.

8. A magnetic core matrix adding device for adding digits represented by the presence of a pulse on a selected one of a plurality of digit lines comprising, in combination, a first and second set of input digit lines for supplying pulses representing the addend and augend, a first and a second rectangular matrix of bistable magnetic cores, the cores in each matrix being arranged in columns corresponding to said first set of input digit lines and arranged in rows corresponding to said second set of input lines, said first set of digit input lines being inductively coupled to the cores in the associated columns of each matrix, said second set of digit input lines being inductively coupled to the cores in the associated rows of each matrix, the parts being selected and arranged so that coincident energization of the first and second digit lines intersecting a core in each matrix is required to reverse the core from a first to a second stable state, means for biasing said cores to their first stable state, a plurality of output digit lines, said output digit lines being inductively coupled to the cores in said first matrix representing the equivalent sums of the numbers represented by the input digit lines associated with the cores, and being inductively coupled to the cores in said second matrix representing the equivalent sums, reduced by one, of the numbers represented by the input digit lines, a carry signal line inductively coupled to each of the cores in said matrices selected by input combinations which involve a carry operation, and control means for selectively disabling said first or said second matrix, said control means being governed by said carry signal line, and comprising a bistable device effective in one state to inhibit the operation of the cores in said first matrix and effective in the other state to inhibit the operation of the cores in said second matrix.

*9. In a core matrix computer, a core array for each logic function to be performed, a function inhibit winding through and individual to each array, and means to select a core array by withholding function inhibit current from the array to be selected, so as to enable said selected core array to perform its logic function.*

*10. In a core matrix computing device, a plurality of magnetic core matrices for performing different logic functions, a separate inhibit winding for each of said matrices, each said inhibit winding being coupled to all of the cores of the associated matrix and operable when activated to prevent said matrix from performing its logic function, and means for selecting a matrix by activating the inhibit windings for all matrices except the selected matrix, so as to enable said selected matrix to perform its logic function.*

*11. In a core matrix computing device, means for determining a plurality of different dependent values in response to a pair of independent values comprising a plurality of logic performing core matrices each including a plurality of magnetic cores arranged in columns and rows, row and column excitation means for each of said independent values and being inductively coupled to the cores of different combinations of individual rows and columns in each of said matrices, energizing means for energizing selected row and column excitation means whereby at least one core in each of said matrices assumes a state indicative of one of said different dependent values.*

*12. In a core matrix computing device, means for determining a plurality of different dependent values in response to first and second independent values comprising two logic performing core matrices each including a plurality of cores arranged in rows and columns, common row and column excitation means for the said matrices, said row excitation means comprising a plurality of row windings each coupling a row of cores from each matrix and each representing a different first independent value, said column excitation means comprising a plurality of column windings each coupling a column of cores from each matrix and each representing a different second independent value, means for activating one row winding and one column winding to excite a predetermined core in each of said matrices, the excited core in one of said two matrices representing a first logically dependent value and the excited core in the other of said two matrices representing a different logically dependent value, and output means for said matrices for indicating the logically dependent values.*

*13. A device for providing first and second dependent functions of numbers represented by the presence of a pulse on one of a plurality of digit lines comprising in combination a first and a second logic performing matrix of bistable magnetic cores, first and second sets of input digit lines representing the numbers, said first and second sets of input digit lines threading the cores of each of said matrices in corresponding coordinates so that a predetermined core in each of said matrices is effectively energized for each combination of inputs by coincident energization of the two input digit lines intersecting the core, each core in the first matrix representing a first logical function of the numbers represented by the two input digit lines intersecting the core, each core in the second matrix representing a different logical function of the numbers represented by the two input digit lines intersecting the core, and a plurality of output digit lines, each said output digit line representing a different number value of said first and second logical functions, each said output winding being coupled to all of the cores in said first and second matrices which represent the same number value as is represented by that output digit line.*

*14. A device for providing first and second dependent logical functions of numbers represented by the presence of a pulse on one of a plurality of digit lines comprising in combination a first and a second matrix of bistable magnetic cores, first and second sets of input digit lines representing the numbers, said first and second sets of input digit lines threading the cores of each of said matrices in corresponding coordinates so that a predetermined core in each of said matrices is effectively energized for each combination of inputs by coincident energization of the two input digit lines intersecting the core, each core in the first logical matrix representing a first function of the numbers represented by the two input digit lines intersecting the core, each core in the second matrix representing a different logical function of the numbers represented by the two input digit lines intersecting the core, output means for the said matrices for indicating the different dependent values, and a separate inhibit winding for each of said matrices, each said inhibit winding being coupled to all of the cores of the associated matrix and operable when activated to prevent said matrix from performing its logical function, and means for selecting one of said two matrices by activating the inhibit winding for the non-selected matrix.*

References Cited in the file of this patent or the original patent

UNITED STATES PATENTS

| | | |
|---|---|---|
| 2,691,155 | Rosenberg et al. | Oct. 5, 1954 |
| 2,776,380 | Andrews | Jan. 1, 1957 |
| 2,785,389 | Warren | Mar. 12, 1957 |
| 2,819,018 | Yetter | Jan. 7, 1958 |
| 2,819,019 | Yetter | Jan. 7, 1958 |

OTHER REFERENCES

Report 211, "A Magnetic Matrix Switch and Its Incorporation Into a Coincident Current Memory," by Olsen, dated June 6, 1952, FIGS. V1–5, V1–4, V1–7, pages 81 and 85.